United States Patent
Ewert et al.

(10) Patent No.: US 9,455,606 B2
(45) Date of Patent: Sep. 27, 2016

(54) WINDING CARRIER FOR USE IN AN ELECTRICAL MACHINE AND WINDING ARRANGEMENT

(75) Inventors: Andreas Ewert, Lichtenau (DE); Lukas Leitz, Kuppenheim (DE); Bjoern Nommensen, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 14/239,171

(22) PCT Filed: Jun. 20, 2012

(86) PCT No.: PCT/EP2012/061818
§ 371 (c)(1),
(2), (4) Date: Jul. 7, 2014

(87) PCT Pub. No.: WO2013/023820
PCT Pub. Date: Feb. 21, 2013

(65) Prior Publication Data
US 2014/0327336 A1 Nov. 6, 2014

(30) Foreign Application Priority Data
Aug. 16, 2011 (DE) .................. 10 2011 081 030

(51) Int. Cl.
*H02K 3/34* (2006.01)
*H02K 3/52* (2006.01)

(52) U.S. Cl.
CPC .............. *H02K 3/345* (2013.01); *H02K 3/522* (2013.01); *H02K 2203/12* (2013.01); *H02K 2213/03* (2013.01)

(58) Field of Classification Search
USPC ................ 310/215, 260, 270, 194
See application file for complete search history.

(56) References Cited

U.S. PATENT DOCUMENTS

| | | | | |
|---|---|---|---|---|
| 1,041,293 A | * | 10/1912 | Keller | ............................. 29/605 |
| 4,454,492 A | * | 6/1984 | Thackray | .............. H01F 27/006 336/192 |
| 4,603,274 A | * | 7/1986 | Mosher | ........................ 310/270 |
| 6,483,220 B1 | * | 11/2002 | Johnsen | ........................ 310/179 |
| 6,972,505 B1 | * | 12/2005 | Leijon | ................... H01F 27/288 174/DIG. 20 |
| 7,579,735 B2 | * | 8/2009 | Otsuji | ........................... 310/194 |
| 8,013,490 B2 | * | 9/2011 | Hino | ....................... H02K 3/34 310/194 |
| 2010/0158724 A1 | * | 6/2010 | Ihle | ........................ F04D 13/06 417/423.7 |

FOREIGN PATENT DOCUMENTS

| | | |
|---|---|---|
| DE | 19818433 | 11/1998 |
| JP | 10225040 | 8/1998 |
| JP | 2006115565 | 4/2006 |

OTHER PUBLICATIONS

International Search Report for Application No. PCT/EP2012/061818 dated Jan. 17, 2014 (English Translation, 2 pages).

* cited by examiner

*Primary Examiner* — Naishadh Desai
(74) *Attorney, Agent, or Firm* — Michael Best & Friedrich LLP

(57) ABSTRACT

The invention relates to a winding carrier (1) for the defined application of a coil winding, comprising: a winding section (2) for placing onto a cylindrical tooth component; a groove structure (3), which is arranged in at least one region of the winding section and extends transversely to the winding axis in order to receive a winding wire; wherein the groove structure (3) has a cross section having two mutually opposite, preferably flat side faces (7), which taper in the direction of a bottom face (6) of the groove structure (3).

11 Claims, 2 Drawing Sheets

WINDING CARRIER FOR USE IN AN ELECTRICAL MACHINE AND WINDING ARRANGEMENT

BACKGROUND OF THE INVENTION

The present invention relates to electrical machines comprising coil windings which are fitted on component teeth with the aid of winding carriers. The present invention also relates to winding carriers for fitting a coil winding, in particular in the form of insulating laminations.

Electrical machines generally have electromagnetic components which are designed in the form of coil windings. The coil windings are each wound around one or more teeth of a stator or of a rotor in order to generate an excitation magnetic field. In the case of coil windings around an individual component tooth, turns of the coil winding are fitted in a spiral manner, wherein the turns are arranged in several layers. A preferred arrangement of the turns is the so-called orthocyclic winding. In the case of an orthocyclic winding, the wires of one layer of the coil winding lie, by at least 30% of their circumference, in the valleys between the individual turns of the layer which is situated therebeneath.

In order to ensure a sufficient degree of insulation between the component teeth and the coil winding, insulating laminations are often provided as winding carriers, said insulation laminations being arranged between the coil winding and the component tooth. Fitting of the coil windings onto the component teeth of the electrical machine can also be simplified by the winding carrier being wound before being placed on the component tooth, so that obstructions owing to the stator geometries can be avoided during winding.

In order to support the orthocyclic design of a winding during coil winding, the winding carriers are prestamped. The stamping structure of the stamping has a groove structure. The groove structure allows defined placement of the first layer of turns of the coil winding, the so-called root layer. The width of the grooves generally corresponds to the largest possible diameter of the winding wire used or is matched to said diameter.

The groove structure, which has been used to date, with a semicircular cross section can lead to winding errors in the layer structure since the individual turns within the groove structure can shift due to pressure from further winding layers which are arranged further above it, in particular when the width of the groove structure is greater than the actual diameter of the winding wire. This can occur since the width of the groove structure generally corresponds to the maximum diameter of the winding wire, the winding process and the associated curvature of the winding wire and the coiling onto the delivery rolls however leads to a change, in particular to a reduction, in the actual diameter of the winding wire. This may result in the winding wire resting in the groove structure of the winding carrier by way of only one support point, as a result of which shifting of the individual turns in the lateral direction (that is to say in the axial direction of the coil winding) cannot be prevented.

This can firstly lead to a disadvantage in the winding process. Secondly, subsequent calibration processes can lead to the turns of the wound layers being spread out. In a calibration process, after the coil winding has been wound, the fully wound coil winding is pressed together in order to compress the turns and push out the bulge of the winding wire on the longitudinal side of a rectangular coil. Support of the winding wire in the groove structure at only one support point also prevents uniform and adequate heat dissipation from the winding wire, via the winding carrier, to the component tooth of the electrical machine.

SUMMARY OF THE INVENTION

The object of the present invention is therefore to simplify the production of an orthocyclic layer structure during coil winding and, in particular, to avoid the above disadvantages caused by the calibration process, and also to improve heat dissipation from the winding wire.

According to a first aspect, a winding carrier is provided for the defined fitting of a coil winding. The winding carrier comprises:
 a winding section which is to be placed onto a cylindrical tooth component;
 a groove structure which is arranged in at least one region of the winding section and extends transversely to the winding axis in order to receive a winding wire; wherein the groove structure has a cross section with two mutually opposite, preferably flat, side faces which taper in the direction of a bottom face of the groove structure.

One idea of the above winding carrier is to design the groove structure such that, regardless of the diameter of the winding wire, which diameter varies owing to the manufacturing process, the winding wire is supported at two support points (as seen in cross section) in the groove structure. This can be ensured by the groove structure being designed with mutually opposite inclined side faces. The inclined side faces have a width which tapers in the receiving direction. The winding wire which is introduced during winding is then held on the mutually opposite side faces.

As a result, it is possible to ensure that the winding wire is held in the winding carrier by way of two support points, so that the position of the winding wire cannot be changed during the winding process and the subsequent calibration process. Furthermore, support of the winding wire at two support points leads to improve heat dissipation from the winding wire to the winding carrier.

Furthermore, the cross section of the groove structure can be trapezoidal or triangular. In particular, an angle of one or both side faces in relation to a depth direction of the groove structure can be between 10° and 40°.

According to one embodiment, a boundary can be provided at at least one axial end of the winding section, said boundary extending outward perpendicularly in the direction of the winding axis.

According to a further aspect, a winding arrangement is provided with the above winding support, wherein a winding wire is introduced into the groove structure of the winding section.

Furthermore, the diameter of the winding wire and the cross section of the groove structure can be matched to one another such that the winding wire rests against the two side faces.

A distance can be provided between the winding wire and a bottom face of the groove structure.

As an alternative, the winding wire can touch a bottom face of the groove structure and, with deformation of the side faces, rest against said side faces.

The winding wire can be arranged in an orthocyclic arrangement in several layers.

BRIEF DESCRIPTION OF THE DRAWINGS

Preferred embodiments of the present invention will be explained in greater detail below with reference to the attached drawings, in which.

DETAILED DESCRIPTION

Figure 1:
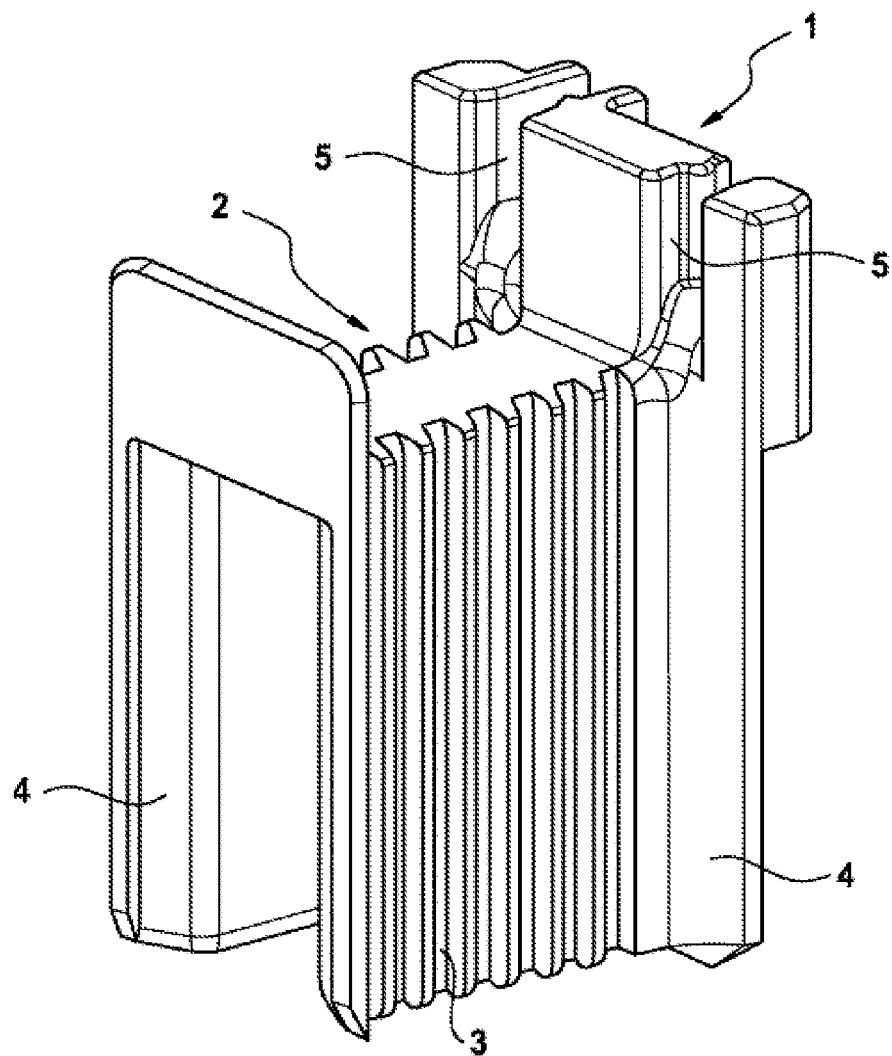
FIG. 1 shows a perspective illustration of a winding carrier.

FIG. 1 shows a perspective illustration of a winding carrier 1 which is to be placed on a component tooth of an electrical machine. In particular, the winding carrier 1 can be placed on a stator tooth or a stator tooth segment in order to design a stator for an electrical machine. The winding carrier 1 is preferably formed from an electrically insulating material, such as plastic for example.

The winding carrier 1 can also have a cylindrical cross section, so that it can be pushed onto a component tooth in the axial direction. As an alternative, as illustrated in FIG. 1, the winding carrier 1 can be designed with an open side, so that it can be pushed laterally onto a component tooth, in particular when said component tooth has a widened tooth head. Two winding carriers of this kind can be placed onto the component tooth from opposite sides in order to completely insulate the component tooth from the winding.

The winding carrier 1 has a substantially cylindrical winding section 2 which, as illustrated in FIG. 1, can be designed with three sides, but also with two sides or four sides (in order to completely surround the stator tooth). The winding support 1 is limited in the axial direction by vertical boundaries 4 in a direction leading away from the axis. The boundaries 4 prevent turns of a coil winding, which is fitted on the winding support 1, slipping off since said boundaries form a lateral boundary for the coil winding.

The cylindrical section 2 is entirely or partially provided with groove structures 3 which each extend transversely to the axial direction of the winding carrier 1. The groove structures 3 determine the arrangement of sections of a winding wire 8, which is to be wound onto said winding carrier 1, in its root layer. The defined arrangement of the winding wire 8 in the root layer also generally prespecifies the layer of the turns of the subsequent winding layers by inserting the winding wire 8 into the corresponding interspaces between the turns in the root layer. Furthermore, the winding carrier 1 can provide clamping slots 5 which fix the two ends of the coil winding.

Figure 2:
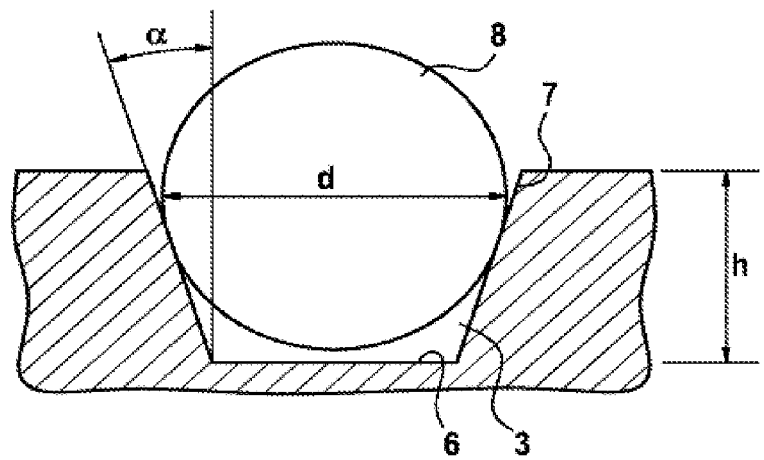
FIG. 2 shows a detail which illustrates a cross section through a groove structure of the winding carrier.

FIG. 2 shows, in detail, a cross section through a groove structure 3 with an inserted winding wire 8. It can be seen that the cross section of the groove structure 3 is formed in a substantially trapezoidal manner with a bottom face 6, which runs parallel to the winding plane, and, preferably flat, side faces 7 which are inclined in relation to said bottom face. The inclination of the side faces 7 is provided such that the width of the groove structures 3 widens in a direction opposite to the bottom face 6. The inserted winding wire 8 butts against the two side faces 7 and, owing to its inclination in relation to the axial position, is held by said side faces.

The width of the bottom face 6 is preferably provided such that the winding wire 8 is held on the side faces 7, without the winding wire 8 touching the bottom face 6. In particular, the groove structure 3 has a depth h which is greater than half the diameter d/2 of the winding wire 8. However, groove structures 3 having a depth h are also conceivable, said depth being less than half the diameter d/w of the winding wire 8. The inclination of the side faces 7 is in each case between 10° and 40°, preferably 20°. The inclination of the side faces 7 can be identical or different.

The distance of the winding wires 8 from the respective bottom faces 6 of the groove structure 3 in the root layer, before the calibration process, is preferably 1 to 100 times the width of an insulation layer which surrounds the winding wire 8. This distance is preferably selected such that it can be overcome by the action of a force in the direction of the bottom face 6, specifically either by deformation of the side faces 7 of the groove structure 3 or by the deformation of the winding wire 8.

As an alternative, the cross section of the groove structure 3 can also be triangular, that is to say a bottom face 6 is not provided between the mutually opposite side faces 7. A groove structure 3 of this kind has the advantage that it can be provided in a particularly simple manner.

Figure 3:
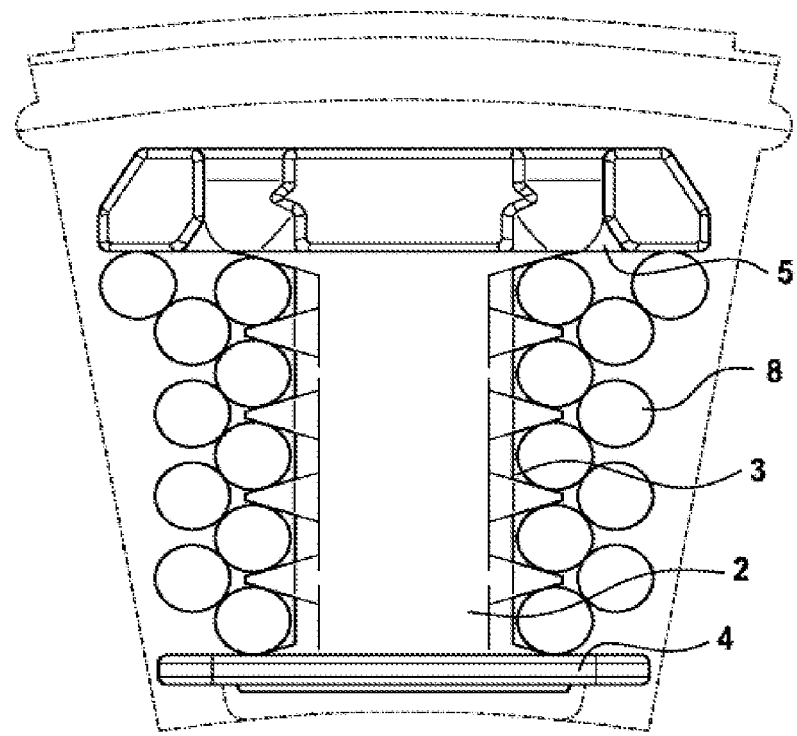
FIG. 3 shows a detail which illustrates a state of the wound winding support after a calibration process.

FIG. 3 shows a cross section of a wound winding carrier 1. Said figure shows two winding layers which are arranged in a so-called orthocyclic winding. In the orthocyclic winding, the wires of one layer of the coil winding lie, by at least 30% of their circumference, in the valleys between the individual turns of the layer situated therebeneath in order to achieve a particularly high winding density. However, this also creates a large force on adjacent turns of the winding layer situated therebeneath in each case. Owing to the proposed geometries of the groove structures 3, this force is absorbed by the side faces 7 of the groove structures 3 and the winding wire 8 is held in its position.

The use of a two-point support prevents axial shifting of the winding wires 8 during production of the coil windings on the winding carrier 1. As a result, it is possible to process winding wires 8 of different thicknesses within a prespecified tolerance range. Furthermore, the provision of two contact points at the side faces 7 prevents the individual turns of the root layer from spreading out when a further layer of turns is fitted. In other words, the layer of turns in the root layer cannot be changed by pressure of the windings from layers which are arranged thereabove.

In addition to the clearly improved fixing of the winding wire 8 by the winding carrier 1 with a two-point support, the shape of the groove structure 3 with inclined side faces 7 likewise has a positive effect on the heat dissipation in the winding carrier 1. Owing to the double contact at the contact points of the winding wire 8 with the winding carrier 1, the region in which heat is transferred is doubled. This has an indirect effect on the heat transfer resistance and reduces it, as a result of which the dissipation of heat from the entire electrical machine in which the winding carrier 1 which is wound in this way is used is improved.

Owing to the provision of the contact points at the inclined side faces 7, it is possible, in a calibration process in which the winding is pressed in the direction of the winding support 1 after the winding carrier 1 is wound, for a further contact point to be created by the winding wire 8 touching a point which faces the bottom face 6. An additional heat transfer region can be formed as a result.

What is claimed is:

1. A winding carrier (1) for the defined fitting of a coil winding, comprising:
   a winding section (2) which is to be placed onto a cylindrical tooth component;
   a groove structure (3) which is arranged in at least one region of the winding section in order to receive a winding wire; and
   a winding wire (8) in contact with the groove structure (3) of the winding section (2);

wherein the groove structure (3) includes two mutually opposite side faces (7) which are angled relative to one another at a non-zero angle to form a groove therebetween to receive the winding wire (8), wherein the groove has a cross-section that is trapezoidal or triangular, and wherein a diameter of the winding wire (8) is such that within the groove, the winding wire (8) rests against only the two side faces (7) and no other portion of the groove structure (3).

2. The winding carrier (1) as claimed in claim 1, wherein an angle of at least one of the side faces (7) in relation to a depth direction of the groove structure (3) is between 10° and 40°.

3. The winding carrier (1) as claimed in claim 1, wherein the groove structure (3) includes a bottom face (6) between the two side faces (7) such that the cross-section of the groove is trapezoidal.

4. The winding carrier (1) as claimed in claim 1, wherein the winding wire (8) is arranged in an orthocyclic arrangement in several layers.

5. The winding carrier (1) as claimed in claim 3, wherein an angle of at least one of the side faces (7) in relation to a depth direction of the groove structure (3) is between 10° and 40°.

6. The winding carrier (1) as claimed in claim 1, further comprising at least one clamping slot (5) that clamps a portion of the winding wire (8).

7. The winding carrier (1) as claimed in claim 1, wherein the groove structure (3) includes multiple grooves formed by side faces (7), wherein a first set of the grooves is disposed along a first leg of the winding section (2), wherein a second set of grooves is disposed along a second, opposite leg of the winding section (2), and wherein the first and second legs extend parallel to one another and are spaced from one another by a top wall.

8. The winding carrier (1) as claimed in claim 1, wherein the winding section (2) has a generally U-shaped structure that includes a first leg, a second leg, and a wall portion between the first and second legs, wherein the first leg includes the groove structure (3), wherein the groove structure (3) includes a plurality of grooves formed by side faces (7), wherein the first leg includes a first end adjacent the wall portion and a second, opposite end spaced from the wall portion, and wherein each of the plurality of grooves extends entirely between the first and second ends.

9. The winding carrier (1) as claimed in claim 8, wherein the plurality of grooves do not extend along the wall portion.

10. The winding carrier (1) as claimed in claim 8, wherein each of the plurality of grooves extends linearly, in parallel arrangement relative to one another.

11. The winding carrier (1) as claimed in claim 8, wherein the wall portion is planar, and wherein each of the first and second legs extends generally linearly away from the wall portion.

* * * * *